United States Patent
Shirataki

[11] Patent Number: 5,310,390
[45] Date of Patent: May 10, 1994

[54] AUTOMATIC TRANSMISSION

[75] Inventor: Hirobumi Shirataki, Shizuoka, Japan

[73] Assignee: Jatco Corporation, Japan

[21] Appl. No.: 44,772

[22] Filed: Apr. 12, 1993

Related U.S. Application Data

[62] Division of Ser. No. 766,267, Sep. 27, 1991, Pat. No. 5,224,907.

[30] Foreign Application Priority Data

| Sep. 28, 1990 [JP] | Japan | 2-257261 |
| Sep. 28, 1990 [JP] | Japan | 2-257262 |
| Sep. 28, 1990 [JP] | Japan | 2-257263 |

[51] Int. Cl.⁵ ............................................ F16H 37/08
[52] U.S. Cl. ..................................... 475/312; 475/311
[58] Field of Search ............ 475/200, 205, 207, 209, 475/284, 285, 288, 289, 296, 297, 302, 311, 312

[56] References Cited

U.S. PATENT DOCUMENTS

| 4,653,346 | 3/1987 | Kato et al. ............... | 475/205 X |
| 4,676,123 | 6/1987 | Kubo et al. .............. | 475/205 |
| 4,711,138 | 12/1987 | Miura et al. ............. | 475/200 X |
| 4,884,472 | 12/1989 | Miura et al. ............. | 475/285 X |
| 4,914,978 | 4/1990 | Moroto et al. ............ | 475/205 X |
| 4,916,977 | 4/1990 | Aoki et al. .............. | 475/205 |
| 4,966,264 | 10/1990 | Hayakawa ................ | 475/311 X |
| 5,006,102 | 4/1991 | Takase et al. ............ | 475/285 X |
| 5,019,025 | 5/1991 | Hayakawa et al. ......... | 475/285 |
| 5,224,907 | 7/1993 | Shirataki ................ | 475/205 |

FOREIGN PATENT DOCUMENTS

| 58-17253 | 2/1983 | Japan | 475/205 |
| 63-145848 | 6/1988 | Japan | 475/205 |

*Primary Examiner*—Leslie A. Braun
*Assistant Examiner*—Ryan W. Massey
*Attorney, Agent, or Firm*—Ronald P. Kananen

[57] ABSTRACT

The input gear of the secondary gear train is mounted on a hollow input shaft and the reaction element of a planetary gear set is connected with a multi-plate brake and one-way clutch, which are disposed on the opposite side of the input gear with respect to the planetary gear set, by way of a shaft which passes through the hollow input shaft. The multi-plate brake is disposed radially outward of the one-way clutch.

The output gear of the gear train is supported by bearings which are disposed on either side thereof. The bearing on the inboard side of the final gear is arranged to have a diameter which is larger than the output gear and supported in a wall portion of the transmission case per se.

1 Claim, 3 Drawing Sheets

|  | C1 | C2 | C3 | B1 | B2 | B3 | OWC1 | OWC2 |
|---|---|---|---|---|---|---|---|---|
| 1ST |  | ○ |  |  | (○) | ○ | ○ |  |
| 2ND |  | ○ |  | ○ |  | ○ |  |  |
| 3RD | ○ | ○ |  |  |  | ○* |  | (○) |
| 4TH | ○ | ○ | ○ |  |  |  |  |  |
| REV. | ○ |  |  |  | ○ | ○ |  |  |

FIG. 3

AUTOMATIC TRANSMISSION

This application is a division of application Ser. No. 07/766,267 filed Sep. 27, 1991 now U.S. Pat. No. 5,224,907.

BACKGROUND OF THE INVENTION

1. Field of the Invention

The present invention relates generally to an automatic transmission and more specifically to a transmission of the type wherein main and auxiliary gear trains are arranged in parallel with one another.

2. Description of the Prior Art

The Toyota Celica new model hand book published by the Toyota Jidosha Company in August 1986 discloses a transmission arrangement which includes primary and secondary gear trains. These gear trains are arranged such that the shaft axes of each are parallel with one another while the secondary gear train is operatively connected with a final drive gear by way of a counter shaft. One end of the counter shaft has an input gear which meshes with the output gear of the secondary gear train. The other end of the counter shaft carries an output gear which forms part of the final drive.

The output shaft of the primary gear train is placed in drive connection with the input shaft of the secondary gear train by way of meshing output and input gears which are respectively mounted on the primary output and secondary input shafts.

The primary gear train is used to produce first, second and third speeds while the secondary gear train is used to add an overdrive gear or 4th speed.

The secondary gear train includes a planetary gear unit wherein one of the gear elements is operatively connected with a multi-plate brake and used as a reaction element However, this arrangement has suffered from a drawback that, in order to use one of the gear elements of the secondary gear train as a reaction element, it is necessary to disposed the multi-plate brake element between the input and output gears thereof. This increases the length and weight of the shafts between said input and output gears.

Yet another problem has been encountered in that in order to combine a one-way clutch with the multi-plate brake, it is necessary to dispose the one-way clutch in a position which is parallel with the multi-plate element in the axial direction of the shaft. This of course aggravates the shaft length and weight problems.

A further drawback has been encountered in that it is necessary to provide a bearing about the outer periphery of the output gear of the final drive. This bearing requires a bearing cover to support the same. The bearing cover of course must have a diameter greater than the bearing which it supports and induces the problem that extreme care must be exercised when machining the transmission casing in order to prevent possible misalignment problems.

SUMMARY OF THE INVENTION

It is an object of the present invention to provide a transmission of the type which includes parallel primary and and secondary gear trains and which allows the distance between the input and output gears of the secondary gear train to be reduced in a manner which reduces the weight of the arrangement to be reduced.

It is another object of the present invention to provide a gear train arrangement which allows for the provision of a one-way clutch in combination with a multi-plate brake without increasing the shaft length between input and output gears of the secondary gear train and which permits the overall dimensions of the transmission to be reduced.

It is a further object of the present invention to provide a transmission of the above described type which reduces the care which must be taken when machining the bearing supports and which obviates the above mentioned misalignment problems.

In brief, the above objects are achieved by an arrangement wherein the input gear of the secondary gear train is mounted on a hollow input shaft and the reaction element of a planetary gear set is connected with a multi-plate brake and one-way clutch, which are disposed on the opposite side of the input gear with respect to the planetary gear set, by way of a shaft which passes through the hollow input shaft. The multi-plate brake is disposed radially outward of the one-way clutch.

The output gear of the gear train is supported by bearings which are disposed on either side thereof. The bearing on the inboard side of the final gear is arranged to have a diameter which is larger than the output gear and supported in a wall portion of the transmission case per se.

More specifically, a first aspect of the present invention comes in a transmission which features: a primary gear train having an input shaft and an axially aligned output shaft on which input and output gears are respectively mounted; a secondary gear train having an input shaft and an axially aligned output shaft on which input and output gears are respectively mounted, the axially aligned input and output shafts of the secondary gear train being arranged essentially parallel to the axially aligned input and output shafts of the primary gear train, the output gear of the primary gear train being arranged to mesh with the input gear of the secondary gear train; a planetary gear set which forms part of the secondary gear train and which has a gear element which is selectively used as a reaction element; and a reaction element engagement device which is operatively connected with the gear element and which is disposed on the outboard side of the input gear of the secondary gear train with respect to the output gear of the secondary gear train.

A second aspect of the present invention comes in a transmission which features: a primary gear train having an input shaft and an axially aligned output shaft on which input and output gears are respectively mounted; a secondary gear train having an input shaft and an axially aligned output shaft on which input and output gears are respectively mounted, the axially aligned input and output shafts of the secondary gear train being arranged essentially parallel to the axially aligned input and output shafts of the primary gear train, the output gear of the primary gear train meshing with the input gear of the secondary gear train; first and second bearings disposed on first and second sides of the output gear of the secondary gear train, the first bearing having a diameter which is larger than the diameter of the output gear of the secondary gear train.

A third aspect of the present invention comes in a transmission which features: a first support member having a circular opening formed therein; a rotatable member disposed so as to extend into the circular opening; a multi-plate brake disposed between the rotatable member and the circular opening, the multi-plate brake including a piston and a return spring; a second support member which is secured to a peripheral portion of the first support member and which includes a tubular structure for operatively supporting the piston and return spring; and a one-way clutch which is disposed between and operatively connected with the tubular structure and the rotatable member.

A fourth aspect of the present invention comes in a transmission which features: a primary gear train having an output gear; a secondary gear train having a hollow input shaft on which an input gear is mounted and an axially aligned output shaft on which an output gear is mounted, the output gear of the primary gear train being arranged to mesh with the input gear of the secondary gear train; a planetary gear set which forms part of the secondary gear train and which has a first gear which is selectively used as a reaction element, the first gear fixed to a control shaft which extends through the hollow input shaft; a brake and a one-way clutch which operatively interconnect the control shaft with a transmission casing in which the planetary gear train is disposed, the brake being disposed radially outward of the one-way clutch.

A further aspect of the present invention comes in that the above mentioned transmission is such that the the output gear of the secondary gear train is supported by first and second bearing, the first and second bearings being disposed on either side of the output gear and respectively supported by first and second wall portions of the transmission casing, the second bearing being located closer to the input gear than first bearing and arranged to have a diameter which is larger than the diameter of the output gear of the secondary gear train.

BRIEF DESCRIPTION OF THE DRAWINGS

FIG. 3 is a chart showing the manner in which the various friction elements of the gear train shown in FIG. 1 are engaged in order to produce first - fourth and reverse speeds.

DETAILED DESCRIPTION OF THE PREFERRED EMBODIMENTS

Figure 1:
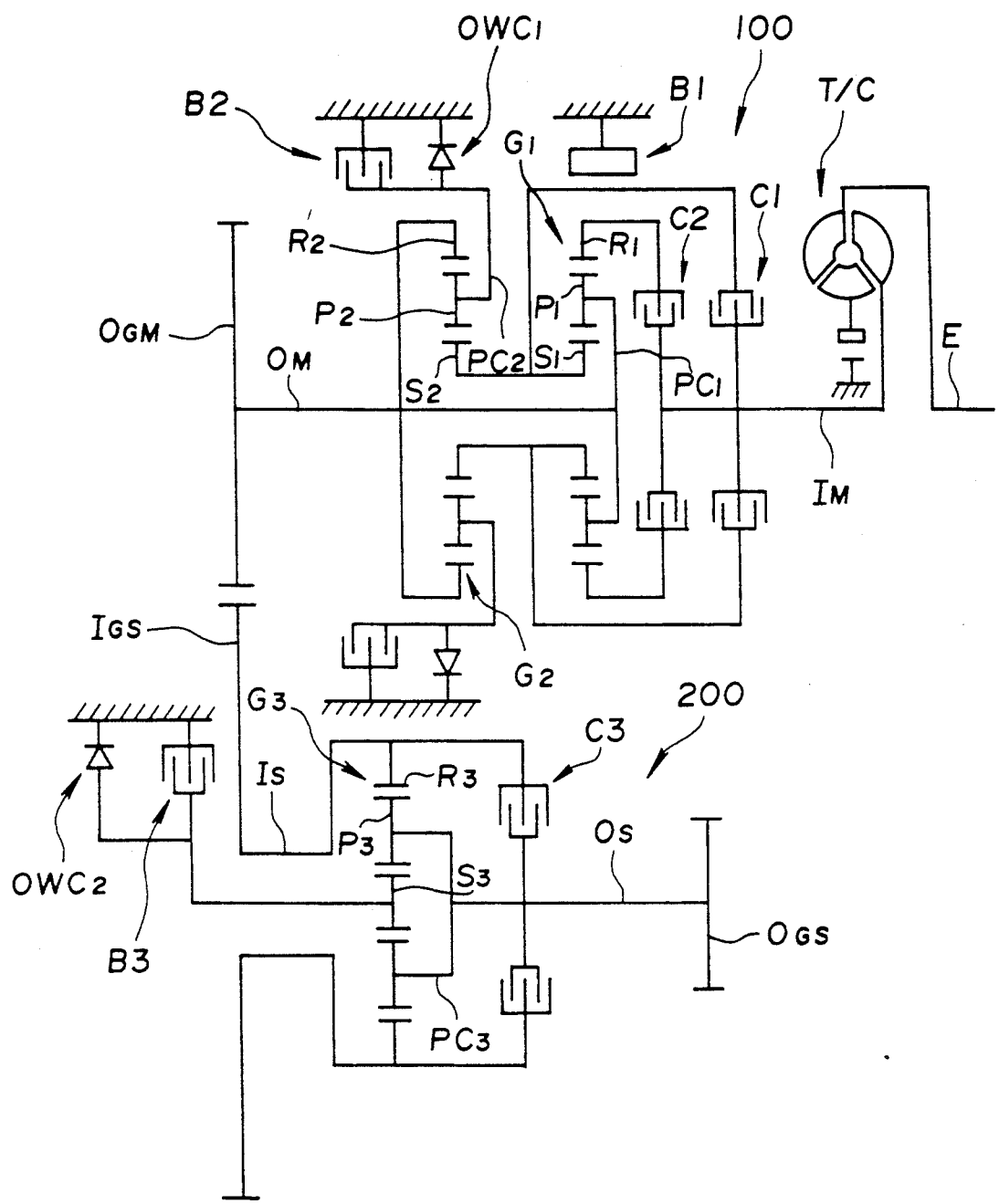
FIG. 1 is a schematic representation of a gear train to which the embodiments of the present invention are applied.
Figure 2:
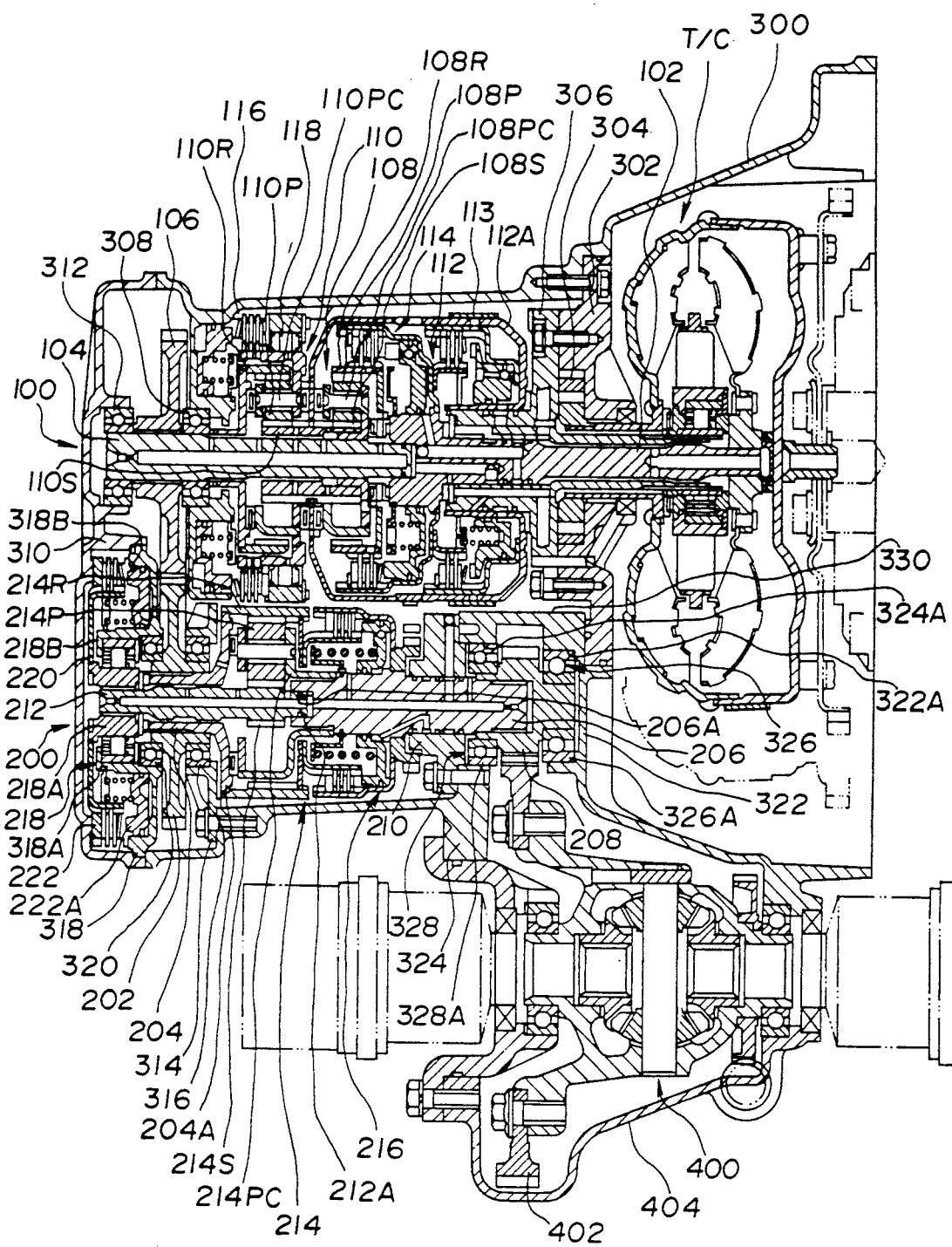
FIG. 2 is a sectional view showing a transmission according to the present invention.

In FIGS. 1 and 2 the numerals 100 and 200 respectively denote a three forward speed primary gear train and a secondary gear train which can be switched between high and low speeds. The axes of the torque transmitting shafts of the two gear trains are arranged parallel with respect to one another.

FIG. 1 schematically shows the arrangement of the first and second gear trains 100, 200. As depicted, a torque converter T/C provides an operative connection between the engine output shaft E and the input shaft IM of the main gear train. The main gear train 100 provides an operative connection between the input shaft IM and the output shaft OM of the same, and comprises first and second planetary gear set G1, G2, first and second clutches C1, C2, first and second brakes B1 and B2 and a one-way clutch OWC1.

The first planetary gear set G1 comprises a sun gear S1, an internal ring gear R1, pinion gears P1 and a pinion carrier PC1. The second gear set G2 comprises a sun gear S2, an internal ring gear R2, pinion gears P2 and a pinion carrier PC2. The above listed gear elements cooperate with the first and second clutches C1, C2 the first and second brakes B1, B2 and the one-way clutch OWC1 in a manner which, when operated in the manner shown in FIG. 3, enable the gear ratio produced between the input and output shafts IM, OM to be varied and the production of first, second and third speeds to be achieved.

The secondary gear train 200 comprises an input shaft Is on which a input gear IGs is mounted. This gear IGs meshes with an output gear OGM mounted on the output shaft OM of the primary gear train 100. The secondary gear train further comprises a third planetary gear set G3. As shown, this third gear set includes a sun gear S3, an internal ring gear R3, pinion gears P3 and a pinion carrier PC3. These elements are arranged to cooperate with a third clutch C3, a third brake B3 and a second one-way clutch OWC2.

Figure 3:
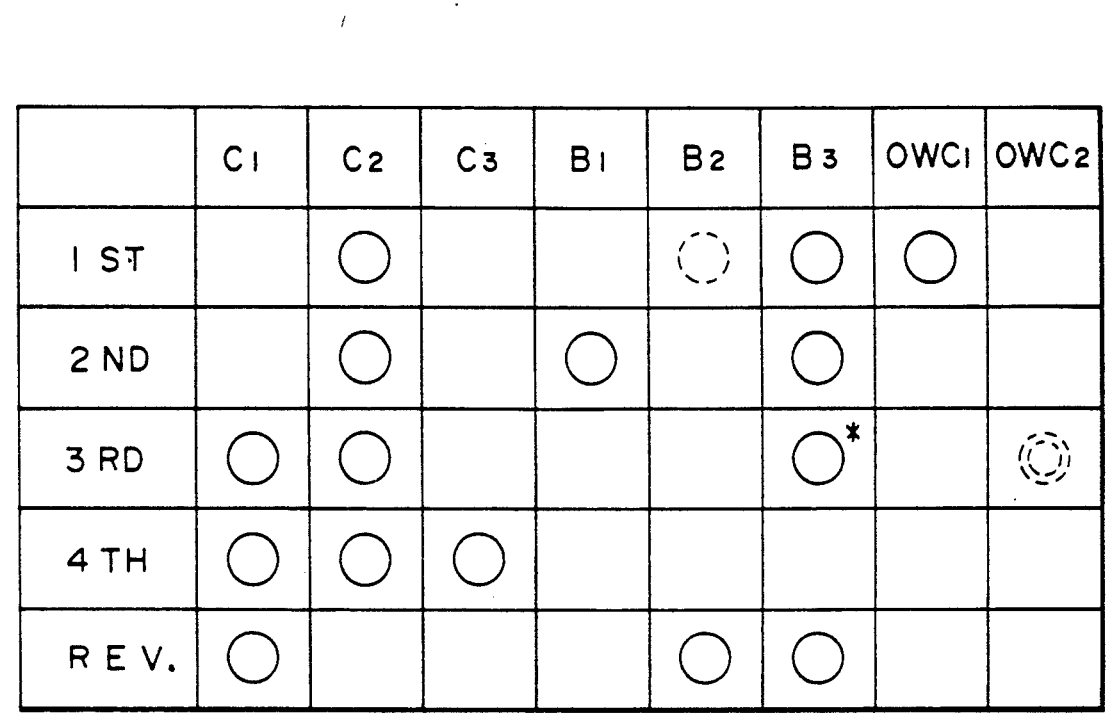

As will be appreciated from FIG. 3, while the transmission is conditioned to produce any of the first ~third speeds, the third clutch C3 of the secondary gear train is conditioned to assume a released condition while the third brake B3 is engaged. This induces the situation wherein the third sun gear S3 is held stationary and the pinion carrier PC3 permitted to rotate. Under these conditions torque is transmitted via the pinion carrier to the output shaft Os of the secondary gear train 200 and the third speed ratio of the transmission is maintained.

When a 3-4 upshift is required, the brake B3 is released and the clutch C3 is engaged. This establishes a direct drive connection between the input and output shafts of the secondary transmission 200 and establishes fourth speed. BY releasing the third brake B3 before engaging the third clutch C3, shift shock is attenuated. In this instance the reverse rotation of the sun gear S3 is prevented by the provision of the second one-way clutch OWC2.

On the other hand, in the event that a 4-3 downshift is required, the third clutch C3 is released and the third brake B3 is engaged with a small delay during which time the one-way clutch OWC2 is driven.

FIG. 2 shows the constructional features of the instant embodiment. In this figure, the numeral 300 denotes transmission casing in which the torque converter T/C and primary and secondary gear trains 100, 200 are disposed. This casing includes a pump housing 302 which is secured to the casing via bolts. A pump housing cover 306 is bolted to the pump housing. A pump gear 304 is enclosed by the pump cover 306. This gear is operatively connected with the engine by way of the T/C pump impeller.

The primary gear train 100 is such as to be connected with the torque converter T/C by way of a main input shaft 102 (IM). A main output shaft 104 has a main output gear 106 splined thereto. The main input and main output shafts 102, 104 are arranged coaxially with respect to one another.

First and second planetary gear sets 108, 110 (G1, G2) are operatively disposed on the two shafts and constructed in a manner such that the sun gears 108S (S1), 110S (S2) are formed as a single integral unit and selectively connectable by way of the first clutch 112 (C1) with the main output shaft 102.

The internal ring gear 108R (R1) first planetary gear set 108 is selectively connectable by way of the second clutch 114( C2) to the output shaft 102, while the pinion carrier 108PC (PC1) which supports the pinion gears 108P (P1) is splined to the main input shaft 104.

A band type first brake 113 (B1) is disposed between the transmission casing 300 and the clutch casing 112A. The casing 112A is fixedly connected to the integral sun gears 108S, 110S, encloses the first and second clutch mechanisms and functions as the brake drum of the band brake 113.

On the other hand, the internal ring gear 110R (R2) of the second planetary gear set 110 is splined to the main output shaft 104 while the pinion carrier 110PC (PC2), which supports the second pinions 110P (P2), has the second brake 116(B2) and the first one-way clutch 118 (OWC1) disposed thereabout.

It should be noted at this point that the outboard end of the main output shaft 104 is supported by two bearings. The first (inboard) bearing 308 is supported in an end wall member of the transmission casing 300 while the second outboard one 312 is supported by transmission casing cover 310. The main output gear 106 is located between the two bearings.

The secondary gear train 200 is such that a secondary input gear 202 (IGs) which meshes with the main output gear 106, is splined to a hollow secondary input shaft 204(Is). The secondary input gear 202 is supported by two bearings. The first inboard bearing 308 is supported in an end wall member 314 which is bolted to the transmission casing 300. The second outboard bearing 320 is supported in an end wall member which is supported by the transmission casing cover 310 and which is constructed to define a cylinder of the third brake.

In this embodiment, in order to provide an opening via which an operative connection between the secondary gear train and the final gear can be established, the transmission casing 300 is formed with a pair of opposed wall portions 322, 324 in which bearings 326 and 328 are respectively supported. The first wall portion 322 extends from the pump housing 302 and has one face exposed to the space in which the torque converter is disposed. The other face of this wall is formed with a circular recess in which the outer race 326A Of the bearing is force fitted. The diameter of this recess is D1.

The second wall portion 324 extends essentially parallel to the first wall portion 322 and is formed with a circular opening into which the outer race 328A of the bearing 328 is force fitted. In this instance the bearing 328 is provided with an oil seal to prevent oil leakage. The diameter of this recess is D2.

An integral wall portion 330 bridges across the top of the two wall portions 322 and 324 and interconnects the same.

The space in which the secondary gear train is disposed is arranged to be clear of projections so that ready access to the through opening and the recess in which the outer races 324A and 322A are disposed, is enabled.

The diameter of the output gear 208 is Do and the diameters D1 and D2 are selected such that $D1 < Do < D2$.

As a result, assembly of the output gear 208 and associated bearings is greatly facilitated.

A bearing retaining member 210 is bolted to the second wall portion 324 in manner which presses the bearing 328 into place.

One end of the secondary input shaft 206 is formed with a coaxial blind bore 206A. A control shaft 212 is rotatably disposed within the hollow secondary input shaft. One end 212A Of this control shaft 212 is received in the blind bore 206A. A sun gear 214S (S3) of the third planetary gear set 214 (G3) is formed integrally on the control shaft 212, while the internal ring gear 214R (R3) thereof is fixed to a radially extending portion 204A of the hollow secondary input shaft 204.

The carrier 214P (PC3) of the third planetary gear set is splined to the same end of secondary output shaft 206 as the blind bore 206A is formed. The internal ring gear 214R and the output shaft 206 are arranged to be selectively interconnected by the third clutch 216 (C3).

The second end of the control shaft 212 extends on the outboard side of the secondary input gear 202 and has a inner race 218A of the second one-way clutch 218 (OWC2) splined thereto. The outer race 218B of this one-way clutch is fixed within an axially extending hollow boss portion 218B of a wall member 318. The wall member 318 is fixedly connected to the transmission casing cover 310. The inner race 218A is fixed to a dishplate 220. A plurality of clutch plates are disposed between an axially extending flange portion of the dishplate 220 and the cover 310.

The wall member 318 is configured in a manner to define a shallow cylindrical or tubular portion 318B in which a piston 222A is reciprocatively disposed. A return spring is disposed between the piston 222A and the dishplate 220 and is arranged to bias the piston into the cylinder in a manner which completes the third brake 222(B2).

It will be noted that the transmission case 300 is formed in a manner to include final drive housing 404 in which the final drive unit 400 is enclosed. Left and right stub axles (shown in phantom) provide an operative connection between the final drive unit 400 and the left and right driven vehicle road wheels.

The above described embodiment operates in the same manner as briefly disclosed in connection with the gear train diagram of FIG. 1. Accordingly, the following description will focus on the secondary gear train 200.

During 1~3 speeds (produced by the primary gear train) the secondary gear train 200 is conditioned such that the third clutch 216 which is associated with the internal ring gear 214R of the third gear train 214 is released, and the third brake 222 is engaged by supplying hydraulic pressure into the chamber defined between the piston 222 and the cylinder portion 318B. Under these conditions, the dishplate 220, the second one-way clutch 218, the inner race 218A and the control shaft 212 which is disposed in the hollow secondary input shaft 212 are prevented from rotating relative to the transmission casing cover 310. This of course prevents the sun gear 214S from rotating with respect to the transmission casing cover 310. As a result, the rotation of the input gear 202, the hollow input shaft 204 and the internal ring gear 214R which is fixed to the input shaft 204, is transferred to the pinion carrier 214PC thus establishing an underdrive condition.

When a 3-4 upshift is required, the third brake 222 is release and the third clutch 216 is engaged. As a result the input shaft 204 and the internal ring gear are directly connected to the output shaft 206 via the third clutch 216.

The effect of this arrangement is such as to allow the disposition of the reaction element control device on the outboard side of the secondary input gear without increasing the distance between the input and output gears. A further feature comes in that the dead space which tends to be encountered with the prior art is made efficient use of.

A further effect comes in that as the bearing 328 is larger in diameter than the output gear 208 it is possible directly support the bearing in the transmission case and thus eliminate the positioning error which tends to be encountered with the above discussed prior art. At the same time, the ease with which bearing/output gear assembly can be assembled and disposed in the transmission case is improved.

It should be noted that in FIG. 3 the solid line circles denote engaged elements while the broken line circles denote engagements which are induced via manual selection. The double broken line circle shows the engagement which occurs before the engagement of third brake B3 and the solid line circle with asterisk denotes engagement which occurs with a delay.

What is claimed is:
1. In a transmission
   a first support member having a circular opening formed therein;
   a rotatable member disposed so as to extend into the circular opening;
   a multi-plate brake disposed between the rotatable member and the circular opening, the multi-plate brake including a piston and a return spring;
   a second support member which is secured to a peripheral portion of said first support member and which includes a tubular structure for operatively supporting the piston and return spring; and
   a one-way clutch which is disposed between and operatively connected with the tubular structure and the rotatable member.

* * * * *